(12) United States Patent
Fu et al.

(10) Patent No.: US 9,309,442 B2
(45) Date of Patent: Apr. 12, 2016

(54) COMPOSITION FOR TUNGSTEN BUFFING (71) Applicant: Cabot Microelectronics Corporation, Aurora, IL (US)

(72) Inventors: Lin Fu, Naperville, IL (US); Jeffrey Dysard, St. Charles, IL (US); Steven Grumbine, Aurora, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 29 days.

(21) Appl. No.: 14/222,086

(22) Filed: Mar. 21, 2014

(65) Prior Publication Data

US 2015/0267081 A1 Sep. 24, 2015

(51) Int. Cl.
*C09G 1/02* (2006.01)
*C23F 3/03* (2006.01)
*B24B 37/04* (2012.01)
*C23F 3/06* (2006.01)

(52) U.S. Cl.
CPC ............... *C09G 1/02* (2013.01); *B24B 37/044* (2013.01); *C23F 3/06* (2013.01)

(58) Field of Classification Search
None
See application file for complete search history.

(56) References Cited

U.S. PATENT DOCUMENTS

| 5,230,833 | A | | 7/1993 | Romberger et al. |
|---|---|---|---|---|
| 5,527,423 | A | * | 6/1996 | Neville ............... C23F 3/00 106/3 |
| 5,958,288 | A | | 9/1999 | Mueller et al. |
| 5,980,775 | A | | 11/1999 | Grumbine et al. |
| 6,083,419 | A | | 7/2000 | Grumbine et al. |
| 6,136,711 | A | | 10/2000 | Grumbine et al. |
| 6,334,880 | B1 | | 1/2002 | Negrych et al. |
| 6,582,623 | B1 | | 6/2003 | Grumbine et al. |
| 6,646,348 | B1 | | 11/2003 | Grumbine et al. |
| 6,656,241 | B1 | | 12/2003 | Hellring et al. |
| 6,676,719 | B2 | | 1/2004 | Lortz et al. |
| 6,750,257 | B2 | | 6/2004 | Matsumura et al. |
| 6,776,810 | B1 | | 8/2004 | Cherian et al. |
| 6,930,054 | B2 | | 8/2005 | Lee et al. |
| 7,018,560 | B2 | | 3/2006 | Liu et al. |
| 7,022,255 | B2 | | 4/2006 | Siddiqui et al. |
| 7,029,508 | B2 | | 4/2006 | Scott et al. |
| 7,044,836 | B2 | | 5/2006 | Sun et al. |
| 7,056,449 | B2 | | 6/2006 | Hoefler |
| 7,077,880 | B2 | | 7/2006 | Siddiqui |
| 7,247,567 | B2 | | 7/2007 | Vacassy et al. |
| 7,306,637 | B2 | | 12/2007 | Cherian et al. |
| 7,429,338 | B2 | | 9/2008 | Siddiqui |
| 7,585,340 | B2 | | 9/2009 | Dysard |
| 7,618,723 | B2 | | 11/2009 | Usui et al. |
| 7,691,287 | B2 | | 4/2010 | Siddiqui et al. |

(Continued)

OTHER PUBLICATIONS

Korean Intellectual Property Office as International Searching Authority, The International Search Report and the Written Opinion of the International Searching Authority issued in connection with Patent Application No. PCT/US2015/021666 on Jun. 30, 2015.

*Primary Examiner* — Allan Olsen
(74) *Attorney, Agent, or Firm* — Thomas Omholt; Arlene Hornilla; Christopher C. Streinz (57) ABSTRACT

A chemical mechanical polishing composition for polishing a substrate having a tungsten layer includes a water based liquid carrier and colloidal silica abrasive particles dispersed in the liquid carrier. The colloidal silica abrasive particles have a permanent positive charge of at least 6 mV. About 30 percent or more of the colloidal silica abrasive particles include three or more aggregated primary particles.

25 Claims, 1 Drawing Sheet

(56) References Cited

U.S. PATENT DOCUMENTS

| | | |
|---|---|---|
| 7,915,071 B2 | 3/2011 | Siddiqui et al. |
| 7,994,057 B2 | 8/2011 | Dysard et al. |
| 8,021,449 B2 | 9/2011 | Seth et al. |
| 8,053,479 B2 | 11/2011 | Masuda et al. |
| 8,119,529 B2 | 2/2012 | Guo et al. |
| 8,163,049 B2 | 4/2012 | Siddiqui |
| 8,252,687 B2 | 8/2012 | Li et al. |
| 8,309,615 B2 | 11/2012 | Hoefler |
| 8,361,176 B2 | 1/2013 | Seth et al. |
| 8,366,059 B2 | 2/2013 | Fannon et al. |
| 8,366,959 B2 | 2/2013 | Babu et al. |
| 8,529,787 B2 | 9/2013 | Higuchi et al. |
| 8,715,524 B2 | 5/2014 | Kamimura et al. |
| 2001/0003672 A1 | 6/2001 | Inoue et al. |
| 2001/0039766 A1* | 11/2001 | Hattori et al. ............ 51/308 |
| 2003/0157804 A1 | 8/2003 | Puppe et al. |
| 2005/0155296 A1* | 7/2005 | Siddiqui ............ 51/307 |
| 2006/0096179 A1 | 5/2006 | Lu et al. |
| 2006/0124592 A1 | 6/2006 | Miller et al. |
| 2006/0124593 A1* | 6/2006 | Moyaerts ............ C09G 1/02 216/88 |
| 2007/0075042 A1 | 4/2007 | Siddiqui |
| 2007/0251418 A1 | 11/2007 | Magee et al. |
| 2007/0269987 A1 | 11/2007 | Nakano et al. |
| 2008/0104893 A1* | 5/2008 | Oh ............ 51/308 |
| 2009/0081927 A1 | 3/2009 | Grumbine et al. |
| 2009/0202816 A1 | 8/2009 | Schlenoff |
| 2009/0215269 A1 | 8/2009 | Boggs et al. |
| 2009/0246957 A1 | 10/2009 | Kamimura |
| 2010/0071272 A1 | 3/2010 | Higuchi et al. |
| 2010/0120250 A1* | 5/2010 | Amanokura ............ C09G 1/02 438/693 |
| 2010/0181525 A1 | 7/2010 | Belmont |
| 2010/0330809 A1 | 12/2010 | Inaba et al. |
| 2011/0027997 A1* | 2/2011 | Shinoda ............ B24B 37/044 438/693 |
| 2011/0163262 A1* | 7/2011 | Higuchi ............ C01B 33/14 252/79.1 |
| 2011/0318929 A1 | 12/2011 | Mishima et al. |
| 2012/0094491 A1 | 4/2012 | Kanamaru |
| 2012/0156874 A1 | 6/2012 | Han et al. |
| 2012/0252214 A1 | 10/2012 | Kamimura et al. |
| 2013/0283704 A1* | 10/2013 | Yoneda et al. ............ 51/308 |
| 2014/0220779 A1* | 8/2014 | Kim et al. ............ 438/693 |

* cited by examiner

COMPOSITION FOR TUNGSTEN BUFFING

BACKGROUND OF THE INVENTION

Chemical-mechanical polishing (CMP) compositions and methods for polishing (or planarizing) the surface of a substrate are well known in the art. Polishing compositions (also known as polishing slurries, CMP slurries, and CMP compositions) for polishing metal layers (such as tungsten) on a semiconductor substrate may include abrasive particles suspended in an aqueous solution and chemical accelerators such as oxidizers, chelating agents, catalysts, and the like.

In a conventional CMP operation, the substrate (wafer) to be polished is mounted on a carrier (polishing head) which is in turn mounted on a carrier assembly and positioned in contact with a polishing pad in a CMP apparatus (polishing tool). The carrier assembly provides a controllable pressure to the substrate, pressing the substrate against the polishing pad. The substrate and pad are moved relative to one another by an external driving force. The relative motion of the substrate and pad abrades and removes a portion of the material from the surface of the substrate, thereby polishing the substrate. The polishing of the substrate by the relative movement of the pad and the substrate may be further aided by the chemical activity of the polishing composition (e.g., by an oxidizing agent and other chemical compounds present in the CMP composition) and/or the mechanical activity of an abrasive suspended in the polishing composition.

In typical tungsten plug and interconnect processes, tungsten is deposited over a dielectric and within openings formed therein. The excess tungsten over the dielectric layer is then removed during a CMP operation to form tungsten plugs and interconnects within the dielectric. As semiconductor device feature sizes continue to shrink, meeting local and global planarity requirements has become more difficult in CMP operations (e.g., in tungsten CMP operations). Array erosion (also referred to as oxide erosion), plug and line recessing, and tungsten etching defects are known to compromise planarity and overall device integrity. For example, excessive array erosion may lead to difficulties in subsequent lithography steps as well as cause electrical contact problems that can degrade electrical performance. Tungsten etching/corrosion and plug and line recessing may also degrade electrical performance or even cause device failure.

In order to meet the local and global planarity requirements commercial tungsten CMP operations sometimes employ multiple polishing steps. For example, a first step may be employed to remove bulk tungsten metal from the substrate while a second step may be employed to remove any remaining tungsten and various binder layers from the underlying dielectric layer. A second polishing step is sometimes also employed to remove defects from the underlying dielectric layer. While such multi-step polishing operations may improve device planarity, there remains a need in the industry for further improvements, particularly for tungsten CMP slurries (or compositions) that are suitable for use in a second polishing step.

BRIEF SUMMARY OF THE INVENTION

A chemical mechanical polishing composition for polishing a substrate having a tungsten layer is disclosed. The composition includes a water based liquid carrier and colloidal silica abrasive particles dispersed in the liquid carrier. About 30 percent or more of the colloidal silica abrasive particles include three or more aggregated primary particles. The colloidal silica abrasive particles further have a permanent positive charge of at least 6 mV. A method for chemical mechanical polishing a substrate including a tungsten layer is further disclosed. The method may include contacting the substrate with the above described polishing composition, moving the polishing composition relative to the substrate, and abrading the substrate to remove a portion of the tungsten from the substrate and thereby polish the substrate.

BRIEF DESCRIPTION OF THE FIGURE

For a more complete understanding of the disclosed subject matter, and advantages thereof, reference is now made to the following descriptions taken in conjunction with the accompanying FIGURE which depicts a transmission electron micrograph (TEM) of example colloidal silica particles from a dispersion in which 30 percent or more of the colloidal silica particles in the dispersion include three or more aggregated primary particles.

DETAILED DESCRIPTION OF THE INVENTION

A chemical mechanical polishing composition for polishing a substrate having a tungsten layer is disclosed. The composition includes a water based liquid carrier and colloidal silica abrasive particles dispersed in the liquid carrier. About 30 percent or more of the colloidal silica abrasive particles include three or more aggregated primary particles. The colloidal silica abrasive particles further have a permanent positive charge of at least 6 mV. The polishing composition may further optionally include from about 1 weight percent to about 4 weight percent of the colloidal silica abrasive particles, an iron containing accelerator, an oxidizer, an amine compound in solution in the liquid carrier, a pH in a range from about 3 to about 4, and/or an electrical conductivity of less than 1000 μS/cm. A mean particle size of the colloidal silica particles may optionally be in a range from about 40 nm to about 70 nm.

A method for chemical mechanical polishing a substrate including a tungsten layer is further disclosed. The method may include contacting the substrate with the above described polishing composition, moving the polishing composition relative to the substrate, and abrading the substrate to remove a portion of the tungsten from the substrate and thereby polish the substrate. A rate of removal of silicon dioxide may be greater than or equal to a rate of removal of tungsten during polishing.

The polishing composition contains a dispersion of abrasive colloidal silica particles suspended in a liquid carrier (e.g., water). As used herein the term colloidal silica particles refers to silica particles that are prepared via a wet process rather than a pyrogenic or flame hydrolysis process which produces structurally different particles. A suitable dispersion may include both aggregated and non-aggregated colloidal silica particles. As is known to those of ordinary skill in the art, non-aggregated particles are individually discrete particles that may be spherical or nearly spherical in shape, but can have other shapes as well (such as generally elliptical, square, or rectangular cross-sections). These non-aggregated particles are referred to as primary particles. Aggregated particles are particles in which multiple discrete particles (primary particles) have clustered or bonded together to form aggregates having generally irregular shapes. The colloidal silica dispersion used in the disclosed polishing compositions may be said to be at least partially aggregated in that 30 percent or more of the colloidal silica particles in the dispersion include three or more aggregated primary particles.

Preferably, the colloidal silica is a precipitated or condensation-polymerized silica, which may be prepared using any method known to those of ordinary skill in the art, such as by the sol gel method or by silicate ion-exchange. Condensation-polymerized silica particles are often prepared by condensing $Si(OH)_4$ to form substantially spherical particles. The precursor $Si(OH)_4$ may be obtained, for example, by hydrolysis of high purity alkoxysilanes, or by acidification of aqueous silicate solutions. U.S. Pat. No. 5,230,833 discloses one method for preparing colloidal silica particles in solution.

A partially aggregated dispersion in which 30 percent or more of the colloidal silica particles in the dispersion include three or more aggregated primary particles may be prepared, for example, using a multi-step process in which primary particles are first grown in solution, for example as described in the '833 patent. The pH of the solution may then be adjusted to an acidic value for a predetermined time period to promote aggregation (or partial aggregation). An optional final step may allow for further growth of the aggregates (and any remaining primary particles).

Figure 1:
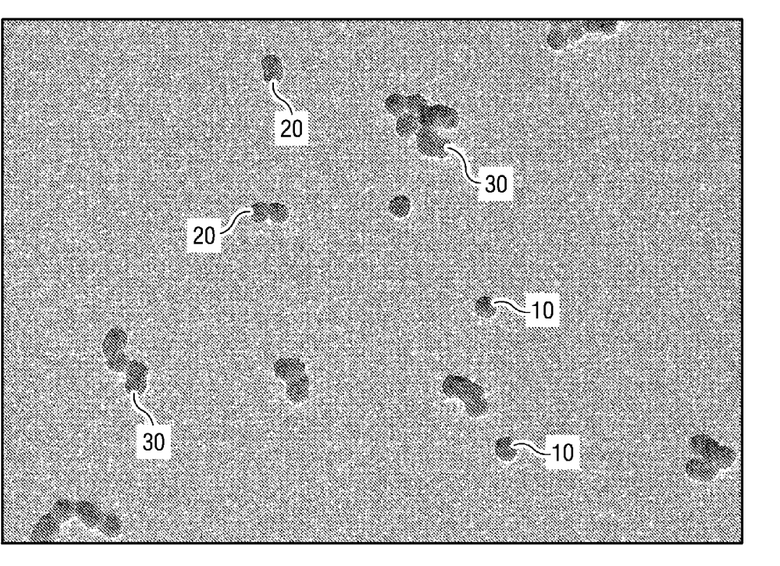

The FIGURE is a transmission electron micrograph (TEM) of example colloidal silica particles from a dispersion in which 30 percent or more of the colloidal silica particles in the dispersion include three or more aggregated primary particles. The example TEM depicts primary particles at 10, aggregates including two primary particles at 20, and aggregates including three or more primary particles at 30. The example TEM shown includes 12 colloidal silica particles, three of which are primary particles, two of which are aggregates including two primary particles, and the remaining seven of which are aggregates including three or more primary particles.

The particle size of a particle is the diameter of the smallest sphere that encompasses the particle. The partially aggregated dispersion may have any suitable particle size, e.g., an average particle size (aggregate size) in a range from about 5 to about 150 nm. The abrasive particles may have an average particle size (aggregate size) of about 20 nm or more (e.g., about 25 nm or more, about 30 nm or more, about 40 nm or more, or about 45 nm or more). The abrasive particles may have an average particle size (aggregate size) of about 100 nm or less (e.g., about 90 nm or less, about 80 nm or less, about 70 nm or less, or about 65 nm or less). Accordingly, the abrasive particles may have an average particle size (aggregate size) in a range from about 20 nm to about 90 nm (e.g., from about 25 nm to about 90 nm, or from about 30 nm to about 90 nm). Preferably, the dispersion has an average particle size in a range from about 40 to about 70 nm or in a range from about 45 to about 65 nm. The particle size of the colloidal silica particles may be measured using a dynamic light scattering tool such as the Zetasizer® available from Malvern Instruments® (Worcestershire, UK).

The polishing composition may include any suitable amount of colloidal silica particles. The polishing composition typically includes about 0.01 wt. % or more colloidal silica (e.g., about 0.05 wt. % or more). More typically, the polishing composition may include about 0.1 wt. % or more (e.g., about 1 wt. % or more, about 5 wt. % or more, about 7 wt. % or more, about 10 wt. % or more, or about 12 wt. % or more) colloidal silica particles. The amount of colloidal silica particles in the polishing composition is typically about 30 wt. % or less, and more typically about 20 wt. % or less (e.g., about 15 wt. % or less, about 10 wt. % or less, about 5 wt. % or less, about 3 wt. % or less, or about 2 wt. % or less). Preferably, the amount of colloidal silica particles in the polishing composition is in a range from about 0.01 wt. % to about 20 wt. %, and more preferably from about 0.05 wt. % to about 15 wt. % (e.g., from about 0.1 wt. % to about 10 wt. %, from about 0.1 wt. % to about 4 wt. %, from about 0.1 wt. % to about 3 wt. %, from about 0.1 wt. % to about 2 wt. %, or from about 0.2 wt. % to about 2 wt. %).

The liquid carrier is used to facilitate the application of the abrasive and any optional chemical additives to the surface of a suitable substrate to be polished (e.g., planarized). The liquid carrier may be any suitable carrier (e.g., solvent) including lower alcohols (e.g., methanol, ethanol, etc.), ethers (e.g., dioxane, tetrahydrofuran, etc.), water, and mixtures thereof. Preferably, the liquid carrier comprises, consists essentially of, or consists of water, more preferably deionized water.

The colloidal silica particles have a positive charge of at least 6 mV in the polishing composition. The charge on dispersed particles such as colloidal silica particles is commonly referred to in the art as the zeta potential (or the electrokinetic potential). The zeta potential of a particle refers to the electrical potential difference between the electrical charge of the ions surrounding the particle and the electrical charge of the bulk solution of the polishing composition (e.g., the liquid carrier and any other components dissolved therein). The zeta potential is typically dependent on the pH of the aqueous medium. For a given polishing composition, the isoelectric point of the particles is defined as the pH at which the zeta potential is zero. As the pH is increased or decreased away from the isoelectric point, the surface charge (and hence the zeta potential) is correspondingly decreased or increased (to negative or positive zeta potential values). The zeta potential of a dispersion such as a polishing composition may be obtained using the Model DT-1202 Acoustic and Electro-acoustic spectrometer available from Dispersion Technologies, Inc (Bedford Hills, N.Y.).

The colloidal silica particles in the polishing composition have a permanent positive charge of about 6 mV or more (e.g., about 10 mV or more, about 15 mV or more, about 20 mV or more, about 25 mV or more, or about 30 mV or more). The colloidal silica particles in the polishing composition may have a permanent positive charge of about 50 mV or less (e.g., about 45 mV or less, about 40 mV or less, or about 35 mV or less). Preferably, the colloidal silica particles have a permanent positive charge in a range from about 6 mV to about 50 mV (e.g., about 10 mV to about 45 mV, about 15 mV to about 40 mV, or about 20 mV to about 40 mV).

By permanent positive charge it is meant that the positive charge on the silica particles is not readily reversible, for example, via flushing, dilution, filtration, and the like. A permanent positive charge may be the result, for example, of incorporating a cationic compound on and/or in the particle. The cationic compound may include, for example, a metal cation, a nitrogen containing compound such as an amine, and/or a phosphonium compound. A permanent positive charge may results, for example, from a covalent interaction between the particle and the cationic compound and is in contrast to a reversible positive charge that may be the result, for example, of an electrostatic interaction between the particle and the cationic compound. It will be understood that the present disclosure is not limited to any particular means of obtaining the permanent positive charge.

Notwithstanding, as used herein, a permanent positive charge of at least 6 mV means that the zeta potential of the colloidal silica particles remains above 6 mV after the following three step filtration test. A volume of the polishing composition (e.g., 200 ml) is filtered through a Millipore Ultracell regenerated cellulose ultrafiltration disk (e.g., having a MW cutoff of 100,000 Daltons and a pore size of 6.3 nm). The remaining dispersion (the approximately 65 ml of dispersion that is retained by the ultrafiltration disk) is collected and replenished with pH adjusted deionized water. The deionized water is pH adjusted to the original pH of the polishing composition using a suitable inorganic acid such as nitric acid. This procedure is repeated for a total of three filtration cycles. The zeta-potential of the triply filtered and replenished polishing composition is then measured and compared with the zeta potential of the original polishing composition. This three step filtration test is further illustrated below by way of example (Example 6).

While not wishing to be bound by theory, it is believed that the dispersion retained by the ultrafiltration disk (the retained dispersion) includes the silica particles and any chemical components (e.g., cationic species) that may be associated with the surface of the particles (e.g., bonded, attached, electrostatically interacting, or in contact with the particle surface). At least a portion of the liquid carrier and the chemical components dissolved therein pass through the ultrafiltration disk. Replenishing the retained dispersion to the original volume is believed to upset the equilibrium in the original polishing composition such that the chemical components associated with the particle surface may tend towards a new equilibrium. Components that are strongly associated (e.g., covalently bonded) with the particle surface remain on the surface such that there tends to be little if any change in the positive zeta potential of the particle. In contrast, a portion of components that have a weaker association (e.g., an electrostatic interaction) with the particle surface may return to the solution as the system tends towards the new equilibrium thereby resulting in a reduction in the positive zeta potential. Repeating this process for a total of three ultrafiltration and replenishing cycles is believed to amplify the above described effect.

It is preferred that there is little difference between the zeta potential of the colloidal silica particles in the original polishing composition and the colloidal silica particles in the polishing composition after the above described three step filtration test (after correcting for ionic strength differences resulting from the filtration test). For example, it is preferred that the zeta potential of the colloidal silica particles in the original polishing composition is less than about 10 mV greater than the colloidal silica particles after the three step filtration test (e.g., less than about 7 mV greater, less than about 5 mV greater, or even less than about 2 mV greater).

The polishing composition is acidic having a pH of less than about 7. The polishing composition typically has a pH of about 2 or more (e.g., about 2.5 or more, or about 3 or more). Preferably, the polishing composition has a pH of about 6 or less (e.g., about 5 or less, or about 4 or less). More preferably, the polishing composition has a pH in a range from about 2 to about 6 (e.g., from about 2.5 to about 5, or from about 3 to about 4). The pH of the polishing composition may be achieved and/or maintained by any suitable means. The polishing composition may include substantially any suitable pH adjusting agents or buffering systems. For example, suitable pH adjusting agents may include nitric acid, sulfuric acid, ammonium hydroxide, and the like while suitable buffering agents may include phosphates, sulfates, acetates, borates, ammonium salts, and the like.

The disclosed polishing compositions have been observed to achieve a higher silicon dioxide (TEOS) polishing rate and therefore a lower W:TEOS selectivity when the electrical conductivity of the polishing composition is low. Example polishing compositions may therefore advantageously have an electrical conductivity of less than 2000 µS/cm (e.g., less than 1500 µS/cm, less than 1000 µS/cm, or less than 800 µS/cm, or less than 600 µS/cm).

Optional embodiments of the polishing composition may further include an iron containing accelerator. An iron containing accelerator as used herein is an iron containing chemical compound that increases the removal rate of tungsten during a tungsten CMP operation. For example, the iron containing accelerator may include an iron containing catalyst such as is disclosed in U.S. Pat. Nos. 5,958,288 and 5,980,775. Such an iron containing catalyst may be soluble in the liquid carrier and may include, for example, ferric (iron III) or ferrous (iron II) compounds such as iron nitrate, iron sulfate, iron halides, including fluorides, chlorides, bromides, and iodides, as well as perchlorates, perbromates and periodates, and organic iron compounds such as iron acetates, acetylacetonates, citrates, gluconates, malonates, oxalates, phthalates, and succinates, and mixtures thereof.

An iron containing accelerator may also include an iron containing activator (e.g., a free radical producing compound) or an iron containing catalyst associated with (e.g., coated or bonded to) the surface of the colloidal silica particle such as is disclosed in U.S. Pat. Nos. 7,029,508 and 7,077,880. For example, the iron containing accelerator may be bonded with the silanol groups on the surface of the colloidal surface particle. In one embodiment the iron containing accelerator may include a boron containing stabilizer and an iron containing catalyst. In such embodiments the stabilizer and catalyst may occupy substantially any percentage of the available surface sites on the colloidal silica particles, for example, greater than 1%, greater than 50%, or greater than 80% of the available surface sites.

The amount of iron containing accelerator in the polishing composition may be varied depending upon the oxidizing agent used and the chemical form of the accelerator. When the preferred oxidizing agent hydrogen peroxide (or its analogs) is used and a soluble iron containing catalyst is used (such as ferric nitrate), the catalyst may be present in the composition in an amount sufficient to provide a range from about 1 to about 3000 ppm Fe based on the total weight of the composition. The polishing composition preferably includes about 2 ppm Fe or more (e.g., about 5 ppm or more, about 10 ppm or more, or about 20 ppm or more). The polishing composition preferably includes about 500 ppm Fe or less (e.g., about 200 ppm or less, about 100 ppm or less, or about 50 ppm or less). The polishing composition may thus include a range from about 2 to about 500 ppm Fe (e.g., from about 3 to about 200 ppm, from about 5 to about 100 ppm, or from about 10 to about 50 ppm).

Embodiments of the polishing composition including an iron containing accelerator may further include a stabilizer. Without such a stabilizer, the iron containing accelerator and the oxidizing agent may react in a manner that degrades the oxidizing agent rapidly over time. The addition of a stabilizer tends to reduce the effectiveness of the iron containing accelerator such that the choice of the type and amount of stabilizer added to the polishing composition may have a significant impact on CMP performance. The addition of a stabilizer may lead to the formation of a stabilizer/accelerator complex that inhibits the accelerator from reacting with the oxidizing agent while at the same time allowing the accelerator to remain sufficiently active so as to promote rapid tungsten polishing rates.

Useful stabilizers include phosphoric acid, organic acids, phosphonate compounds, nitriles, and other ligands which bind to the metal and reduce its reactivity toward hydrogen peroxide decomposition and mixture thereof. The acid stabilizers may be used in their conjugate form, e.g., the carboxylate can be used instead of the carboxylic acid. For purposes of this application the term "acid" as it is used to describe useful stabilizers also means the conjugate base (or bases) of the acid stabilizer. For example the term "adipic acid" means adipic acid and its conjugate bases. Stabilizers can be used alone or in combination and significantly decrease the rate at which oxidizing agents such as hydrogen peroxide decomposes.

Preferred stabilizers include acetic acid, phosphoric acid, phthalic acid, citric acid, adipic acid, oxalic acid, malonic acid, aspartic acid, succinic acid, glutaric acid, pimelic acid, suberic acid, azelaic acid, sebacic acid, maleic acid, glutaconic acid, muconic acid, ethylenediaminetetraacetic acid (EDTA), propylenediaminetetraacetic acid (PDTA), and mixtures thereof. The preferred stabilizers may be added to the compositions and slurries of this invention in an amount ranging from about 1 equivalent per iron containing accelerator to about 3.0 weight percent or more. As used herein, the term "equivalent per iron containing accelerator" means one molecule of stabilizer per iron species in the composition. For example, 2 equivalents per iron containing accelerator means two molecules of stabilizer for each iron species.

The polishing composition may further include an oxidizing agent. The oxidizing agent may be added to the polishing composition during the slurry manufacturing process or just prior to the CMP operation (e.g., in a tank located at the semiconductor fabrication facility). Preferable oxidizing agents include inorganic or organic per-compounds. A per-compound as defined by Hawley's Condensed Chemical Dictionary is a compound containing at least one peroxy group (—O—O—) or a compound containing an element in its highest oxidation state. Examples of compounds containing at least one peroxy group include but are not limited to hydrogen peroxide and its adducts such as urea hydrogen peroxide and percarbonates, organic peroxides such as benzoyl peroxide, peracetic acid, and di-t-butyl peroxide, monopersulfates ($SO_5^=$), dipersulfates ($S_2O_8^=$), and sodium peroxide. Examples of compounds containing an element in its highest oxidation state include but are not limited to periodic acid, periodate salts, perbromic acid, perbromate salts, perchloric acid, perchlorate salts, perboric acid, and perborate salts and permanganates. The most preferred oxidizing agents is hydrogen peroxide.

The oxidizing agent may be present in the polishing composition in an amount ranging, for example, from about 0.1 to about 10 weight percent. In preferred embodiments in which a hydrogen peroxide oxidizer and a soluble iron containing accelerator are used, the oxidizer may be present in the polishing composition in an amount ranging from about 0.1 to about 6 weight percent (e.g., from about 0.2 to about 5 weight percent, from about 0.3 to about 4 weight percent, or from about 0.5 to about 3 weight percent).

The polishing composition may optionally further include a compound that inhibits tungsten etching. Suitable inhibitor compounds inhibit the conversion of solid tungsten into soluble tungsten compounds while at the same time allowing for effective removal of solid tungsten via the CMP operation. Classes of compounds that that are useful inhibitors of tungsten etching include compounds having nitrogen containing functional groups such as nitrogen containing heterocycles, alkyl ammonium ions, amino alkyls, and amino acids. Useful amino alkyl corrosion inhibitors include, for example, hexylamine, tetramethyl-p-phenylene diamine, octylamine, diethylene triamine, dibutyl benzylamine, aminopropylsilanol, aminopropylsiloxane, dodecylamine, mixtures thereof, and synthetic and naturally occurring amino acids including, for example, lysine, tyrosine, glutamine, glutamic acid, cystine, and glycine (aminoacetic acid).

The inhibitor compound may alternatively and/or additionally include an amine compound in solution in the liquid carrier. The amine compound (or compounds) may include a primary amine, a secondary amine, a tertiary amine, or a quaternary amine. The amine compound may further include a monoamine, a diamine, a triamine, a tetramine, or an amine based polymer having a large number of repeating amine groups (e.g., 4 or more amine groups).

In certain embodiments of the polishing compound the amine compound may include a long chain alkyl group. By long chain alkyl group it is meant that the amine compound includes an alkyl group having at least 10 carbon atoms (e.g., at least 12 carbon atoms or at least 14 carbon atoms). Such amine compounds may include, for example, dodecylamine, tetradecylamine, hexadecylamine, octadecylamine, oleylamine, N-methyldioctylamine, N-methyloctadecylamine, cocamidopropylamine oxide, benzyldimethylhexadecylammonium chloride, benzalkonium chloride, cocoalkylmethyl [polyoxyethylene (15)]ammonium chloride, octadecylmethyl[polyoxyethylene (15)]ammonium chloride, and the like.

In certain embodiments of the polishing composition the amine compound may include a polycationic amine. A polycationic amine (as the term is used herein) is an amine compound having multiple (two or more) amine groups in which each of the amine groups is cationic (i.e., has a positive charge). Thus the polycationic amine may include a polyquaternary amine. By polyquaternary amine it is meant that the amine compound includes from 2 to 4 quaternary ammonium groups such that the polyquaternary amine is a diquaternary amine, a triquaternary amine, or a tetraquaternary amine compound. Diquaternary amine compounds may include, for example, N,N'-methylenebis(dimethyltetradeclammonium bromide), 1,1,4,4-tetrabutylpiperazinediium dibromide, N,N,N',N',N'-pentamethyl-N-tallow-1,3-propane-diammonium dichloride, N,N'-hexamethylenebis(tributylammonium hydroxide), decamethonium bromide, didodecyl-tetramethyl-1,4-butanediaminium diiodide, 1,5-dimethyl-1,5-diazoniabicyclo(3.2.2)nonane dibromide, and the like. Triquaternary amine compounds may include, for example, N(1),N(6)-didoecyl-N(1),N(1),N(6),N(6)-tetramethyl-1,6-hexanediaminium diiodide. Tetraquaternary amine compounds may include, for example, methanetetrayltetrakis (tetramethylammonium bromide). The polyquaternary amine compound may further include a long chain alkyl group (e.g., having 10 or more carbon atoms). For example, a polyquaternary amine compound having a long chain alkyl group may include N,N'-methylenebis(dimethyltetradeclammonium bromide), N,N,N',N',N'-pentamethyl-N-tallow-1,3-propanediammonium dichloride, didodecyl-tetramethyl-1,4-butanediaminium diiodide, and N(1),N(6)-didodecyl-N(1),N(1),N(6),N(6)-tetramethyl-1,6-hexanediaminium diiodide.

A polycationic amine may also be polycationic in that each of the amine groups is protonated (and therefore has a positive charge). For example, a dicationic amine such as tetramethyl-p-phenylenediamine includes two tertiary amine groups that may be protonated (and therefore positively charged) at polishing composition pH values less than the pKa of the amine compound.

In certain embodiments of the polishing composition the amine compound may include an amine based polymer. Such a polymer includes four or more amine groups. The amine based polymer may include, for example, triethylenetetramine, tetraethylenepentamine, pentaethylenehexamine, and polymers including the following amine containing functional groups methacryloylox-ethyl trimethyl ammonium methylsulfate, diallyl dimethyl ammonium chloride, and methacrylamido-propyl trimethyl ammonium chloride.

The polishing composition may include substantially any suitable concentration of the amine compound. In general the concentration is desirably high enough to provide adequate etch inhibition, but low enough so that the compound is soluble and so as not to reduce tungsten polishing rates below acceptable levels. By soluble it is meant that the compound is fully dissolved in the liquid carrier or that it forms micelles in the liquid carrier or is carried in micelles. It may be necessary to vary the concentration of the amine compound depending upon numerous and various factors, for example, including the solubility of the amine compound, the number of amine groups in the amine compound, the length of an alkyl group in the amine compound, the relationship between etch rate inhibition and polishing rate inhibition, the oxidizing agent used, the concentration of the oxidizing agent, and so on. In certain desirable embodiments, the concentration of the amine compound in the polishing composition is in a range from about 0.1 µM to about 10 mM (i.e., from about $10^{-7}$ to about $10^{-2}$ molar). For example, in embodiments utilizing an amine based polymer having a high molecular weight, the concentration may be on the lower end of the range (e.g., from about $10^{-7}$ to about $10^{-4}$ molar). In other embodiments utilizing a comparatively simple amine compound (having fewer amine groups and a lower molecular weight), the concentration may be on the higher end of the range (e.g., from about $10^{-5}$ to about $10^{-2}$ molar).

The polishing composition may optionally further include a biocide. The biocide may include any suitable biocide, for example an isothiazolinone biocide. The amount of biocide in the polishing composition typically is in a range from about 1 ppm to about 50 ppm, and preferably from about 1 ppm to about 20 ppm.

The polishing composition may be prepared using any suitable techniques, many of which are known to those skilled in the art. The polishing composition may be prepared in a batch or continuous process. Generally, the polishing composition may be prepared by combining the components thereof in any order. The term "component" as used herein includes the individual ingredients (e.g., the colloidal silica, the iron containing accelerator, the amine compound, etc.)

The colloidal silica may be dispersed in the aqueous liquid carrier. Other components such as an iron containing accelerator and a stabilizer may then be added and mixed by any method that is capable of incorporating the components into the polishing composition. The oxidizing agent may be added at any time during the preparation of the polishing composition. For example, the polishing composition may be prepared prior to use, with one or more components, such as the oxidizing agent, being added just prior to the CMP operation (e.g., within about 1 minute, or within about 10 minutes, or within about 1 hour, or within about 1 day, or within about 1 week of the CMP operation). The polishing composition also may also be prepared by mixing the components at the surface of the substrate (e.g., on the polishing pad) during the CMP operation.

The polishing composition may be supplied as a one-package system comprising a colloidal silica having a permanent positive charge of at least 6 mV, an amine compound, an optional iron containing accelerator and stabilizer, an optional biocide, and water. The oxidizing agent desirably is supplied separately from the other components of the polishing composition and is combined, e.g., by the end-user, with the other components of the polishing composition shortly before use (e.g., 1 week or less prior to use, 1 day or less prior to use, 1 hour or less prior to use, 10 minutes or less prior to use, or 1 minute or less prior to use). Various other two-container, or three- or more-container, combinations of the components of the polishing composition are within the knowledge of one of ordinary skill in the art.

The polishing composition of the invention may also be provided as a concentrate which is intended to be diluted with an appropriate amount of water prior to use. In such an embodiment, the polishing composition concentrate may include the colloidal silica having a permanent positive charge of at least 6 mV, the amine compound, the optional iron containing accelerator and stabilizer, the optional biocide, and water, with or without the oxidizing agent, in amounts such that, upon dilution of the concentrate with an appropriate amount of water, and the oxidizing agent if not already present in an appropriate amount, each component of the polishing composition will be present in the polishing composition in an amount within the appropriate range recited above for each component. For example, the colloidal silica having a permanent positive charge of at least 6 mV, the amine compound, the optional iron containing accelerator and the stabilizer, may each be present in the polishing composition in an amount that is about 2 times (e.g., about 3 times, about 4 times, about 5 times, or even about 10 times) greater than the concentration recited above for each component so that, when the concentrate is diluted with an equal volume of (e.g., 2 equal volumes of water, 3 equal volumes of water, 4 equal volumes of water, or even 9 equal volumes of water respectively), along with the oxidizing agent in a suitable amount, each component will be present in the polishing composition in an amount within the ranges set forth above for each component. Furthermore, as will be understood by those of ordinary skill in the art, the concentrate may contain an appropriate fraction of the water present in the final polishing composition in order to ensure that other components are at least partially or fully dissolved in the concentrate.

Although the polishing composition of the invention may be used to polish any substrate, the polishing composition is particularly useful in the polishing of a substrate comprising at least one metal including tungsten and at least one dielectric material. The tungsten layer may be deposited over one or more barrier layers, for example, including titanium and titanium nitride (TiN). The dielectric layer may be a metal oxide such as a silicon oxide layer derived from tetraethylorthosilicate (TEOS), porous metal oxide, porous or non-porous carbon doped silicon oxide, fluorine-doped silicon oxide, glass, organic polymer, fluorinated organic polymer, or any other suitable high or low-k insulating layer. The composition is particularly well suited for use in a tungsten CMP buffing operation in which it is desired for the tungsten and TEOS polishing rates to be about equal (i.e., a W:TEOS selectivity of about 1:1). For example, the composition may be used to achieve a TEOS polishing rate at least 50 percent of the tungsten polishing rate (e.g., at least 80 percent of the tungsten polishing rate, or at least 100 percent of the tungsten polishing rate, or at least 150 percent of the tungsten polishing rate, or even at least 200 percent of the tungsten polishing rate). The W:TEOS selectivity of the polishing composition may be obtained via blanket wafer measurements or patterned wafer measurements.

The polishing method of the invention is particularly suited for use in conjunction with a chemical-mechanical polishing (CMP) apparatus. Typically, the apparatus comprises a platen, which, when in use, is in motion and has a velocity that results from orbital, linear, or circular motion, a polishing pad in contact with the platen and moving with the platen when in motion, and a carrier that holds a substrate to be polished by contacting and moving relative to the surface of the polishing pad. The polishing of the substrate takes place by the substrate being placed in contact with the polishing pad and the polishing composition of the invention and then the polishing pad moving relative to the substrate, so as to abrade at least a portion of the substrate (such as tungsten, titanium, titanium nitride, and/or a dielectric material as described herein) to polish the substrate.

A substrate can be planarized or polished with the chemical-mechanical polishing composition with any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

The following examples further illustrate the invention but, of course, should not be construed as in any way limiting its scope.

EXAMPLE 1

The silicon oxide (TEOS) polishing rate was evaluated in this example for various polishing compositions. This example demonstrates the effect of colloidal silica particle aggregation on the TEOS polishing rate. The TEOS polishing rates were obtained by polishing eight inch wafers having a TEOS layer using a Mirra® CMP tool (available from Applied Materials) and an IC1010 polishing pad at down-force of 1.5 psi, a platen speed of 100 rpm, and a slurry flow rate of 150 ml/min. Three colloidal silica particle dispersions were evaluated. Each of the dispersions had a primary particle size of about 20 nm. The first dispersion (1A) was made up of predominantly non-aggregated primary colloidal silica particles. The second dispersion (1B) was made up of predominately aggregated colloidal silica particles in which more than 50% of the aggregates included two primary particles. The third dispersion (1C) was made up of aggregated colloidal silica particles in which greater than 30 percent of the aggregates included three or more primary particles. Each of the dispersions was diluted with deionized water such that it included 1.5 weight percent colloidal silica abrasive particles. Each of the polishing compositions had a pH of 3.2 and further included 0.015 weight percent benzotriazole, 0.015 weight percent 5-Amino-1H-tetrazole anhydrous (ATA), 0.010 weight percent DL Alanine, and 0.5 weight percent hydrogen peroxide. Table 1 shows the TEOS polishing rate obtained for each colloidal silica dispersion.

TABLE 1

| Colloidal Silica Dispersion | Solids (percent) | TEOS Polishing Rate (Å/min) |
| --- | --- | --- |
| 1A | 2 | 380 |
| 1B | 2 | 510 |
| 1C | 2 | 1100 |

As is apparent from the results set forth in Table 1, colloidal silica dispersion 1C (made up of aggregated colloidal silica particles in which greater than 30 percent of the aggregates included three or more primary particles) exhibits a significantly increased TEOS polishing rate as compared with colloidal silica dispersions 1A and 1B.

EXAMPLE 2

The silicon oxide (TEOS) polishing rate was evaluated in this example for various polishing compositions. This example demonstrates the effect of colloidal silica particle aggregation on the TEOS polishing rate. The TEOS polishing rates were obtained by polishing eight inch wafers having a TEOS layer using a Mirra® CMP tool (available from Applied Materials) and an IC1010 polishing pad at down-forces of 0.75, 1.5, and 3.0 psi, a platen speed of 100 rpm, and a slurry flow rate of 150 ml/min. Two colloidal silica particle dispersions were evaluated. Each of the dispersions had a primary particle size of about 20 nm. The first dispersion (2A) was made up of predominately aggregated colloidal silica particles in which more than 50% of the aggregates included two primary particles. The second dispersion (2B) was made up of aggregated colloidal silica particles in which greater than 30 percent of the aggregates included three or more primary particles. Each of the dispersions was diluted with deionized water such that it included the indicated weight percent colloidal silica abrasive particles. Each of the polishing compositions had a pH of 3.0 and further included 0.0267 weight percent malonic acid, 0.02 weight percent of an amine modified hyperbranched polymer, and 2 weight percent hydrogen peroxide. Table 2 shows the TEOS polishing rate obtained for each composition.

TABLE 2

| Colloidal Silica Dispersion | Solids (percent) | Down-force (psi) | TEOS Polishing Rate (Å/min) |
| --- | --- | --- | --- |
| 2A | 2 | 1.5 | 640 |
| 2A | 2 | 3 | 770 |
| 2B | 1 | 1.5 | 880 |
| 2B | 1 | 3 | 1310 |
| 2B | 2 | 0.75 | 630 |
| 2B | 2 | 1.5 | 1130 |

As is apparent from the results set forth in Table 2, colloidal silica dispersion 2B (made up of aggregated colloidal silica particles in which greater than 30 percent of the aggregates included three or more primary particles) exhibits a significantly increased TEOS polishing rates as compared with colloidal silica dispersion 2A. For example, even at half the solids (1 vs. 2 percent) and half the polishing down-force (1.5 vs 3 psi) dispersion 2B exhibits a greater TEOS polishing rate than dispersion 2A (880 vs 770 Å/min). At comparable solids (2 percent) and down-force (1.5 psi) dispersion 2B exhibits a TEOS polishing rate approximately twice that of dispersion 2A (1130 vs 640 Å/min).

EXAMPLE 3

The silicon oxide (TEOS) polishing rate was evaluated in this example for various polishing compositions. This example demonstrates the effect of colloidal silica particle aggregate size on the TEOS polishing rate. The aggregate size for each of the colloidal silicas was measured using a Zetasizer® available from Malvern Instruments®. The TEOS polishing rates were obtained by polishing eight inch wafers having a TEOS layer using a Mirra® CMP tool (available from Applied Materials) and an IC1010 polishing pad at down-forces of 1.5 psi, a platen speed of 100 rpm, and a slurry flow rate of 150 ml/min. Colloidal silica dispersions were prepared in which the dispersion was made up of aggregated colloidal silica particles in which greater than 30 percent of the aggregates included three or more primary particles. The average aggregate size ranged from about 25 to about 88 nm. Each of the dispersions was diluted with deionized water such that it contained 3.0 weight percent colloidal silica abrasive particles. Each of the polishing compositions had a pH of 4.0 and further included 0.0025 weight percent Dowfax® C10L (available from Dow Chemical Company), 0.1 weight percent 5-amino-1Htetrazole anhydrous, 0.03 weight percent acetic acid, 0.0014 weight percent of a Kathon® microbicide (available from Dow Chemical Company), and 0.25 weight percent hydrogen peroxide. Table 3 show the TEOS polishing rate obtained for each composition.

TABLE 3

| Colloidal Silica Dispersion | Aggregate Size (nm) | TEOS Polishing Rate (Å/min) |
|---|---|---|
| 3A | 25 | 400 |
| 3B | 30 | 550 |
| 3C | 32 | 610 |
| 3D | 39 | 890 |
| 3E | 42 | 1000 |
| 3F | 45 | 1080 |
| 3G | 48 | 1110 |
| 3H | 50 | 1190 |
| 3I | 57 | 1180 |
| 3J | 64 | 1040 |
| 3K | 67 | 990 |
| 3L | 88 | 800 |

As is apparent from the results set forth in Table 3, a colloidal silica dispersion made up of aggregated colloidal silica particles in which greater than 30 percent of the aggregates included three or more primary particles exhibits a maximum TEOS polishing rate when the aggregate size is about 50 nm. The TEOS polishing rates are highest in a range of aggregate sizes from about 40 to about 70 nm or from about 45 to about 65 nm.

EXAMPLE 4

The silicon oxide (TEOS) polishing rate was evaluated in this example for various polishing compositions. This example demonstrates the effect of the pH of the polishing composition on the TEOS polishing rate. The TEOS polishing rates were obtained by polishing eight inch wafers having a TEOS layer using a Mirra® CMP tool (available from Applied Materials) and an IC1010 polishing pad at down-forces of 4 and 5 psi, a platen speed of 100 rpm, and a slurry flow rate of 250 ml/min. A colloidal silica dispersion was prepared in which the dispersion was made up of aggregated colloidal silica particles in which greater than 30 percent of the aggregates included three or more primary particles. The dispersion was diluted to 2 percent solids and pH adjusted to pH values of 2.2, 2.5, and 3.0 using nitric

TABLE 4

| Polishing Composition | pH | Down-force (psi) | TEOS Polishing Rate (Å/min) |
|---|---|---|---|
| 4A | 2.2 | 4 | 810 |
|    | 2.2 | 5 | 1020 |
| 4B | 2.5 | 4 | 1140 |
|    | 2.5 | 5 | 1450 |
| 4C | 3.0 | 4 | 2550 |
|    | 3.0 | 5 | 2400 |

As is apparent from the results set forth in Table 4, a colloidal silica dispersion made up of aggregated colloidal silica particles in which greater than 30 percent of the aggregates included three or more primary particles exhibits a significantly increased TEOS polishing rate when the pH is greater than 2.5.

EXAMPLE 5

The tungsten polishing rate, tungsten etch rate, and silicon oxide (TEOS) polishing rate was evaluated in this example for various polishing compositions. This example demonstrates the effect of the pH, iron concentration, and the conductivity of the polishing composition on the tungsten polishing rate, tungsten etch rate, and silicon oxide (TEOS) polishing rate. The tungsten and TEOS polishing rates were obtained by polishing eight inch wafers having either a tungsten or a TEOS layer using a Logitech Model II CDP Polisher (Logitech Ltd., Glasgow, UK) and an IC1010 polishing pad at a down-force of 3 psi, a platen speed of 100 rpm, and a slurry flow rate of 125 ml/min. Colloidal silica dispersions were prepared in which the dispersion was made up of aggregated colloidal silica particles in which greater than 30 percent of the aggregates included three or more primary particles. These dispersions were added to mixtures including malonic acid, ferric nitrate nonahydrate ($Fe(NO_3)_3 \cdot 9H_2O$), and water to obtain the polishing compositions shown in Table 5. The pH of the polishing compositions were adjusted to 2, 3, or, 4 (as indicated) using nitric acid. The polishing compositions further included 2 weight percent hydrogen peroxide. Table 6 shows the tungsten polishing rate, tungsten etch rate, and silicon oxide (TEOS) polishing rate obtained for each composition.

TABLE 5

| Polishing Composition | pH | $Fe(NO_3)_3 \cdot 9H_2O$ (ppm) | Solids (percent) | Additive | Conductivity (μS/cm) |
|---|---|---|---|---|---|
| 5A | 3 | 50 | 0.5 | NA | 530 |
| 5B | 3 | 200 | 0.5 | NA | 747 |
| 5C | 3 | 50 | 2 | NA | 563 |
| 5D | 3 | 200 | 2 | NA | 747 |
| 5E | 2 | 200 | 2 | NA | 4130 |
| 5F | 4 | 200 | 2 | NA | 719 |
| 5G | 3 | 200 | 2 | 200 ppm $K_2SO_4$ | 812 |

TABLE 6

| Polishing Composition | W Polish (Å/min) | W Etch (Å/min) | TEOS Rate (Å/min) | W:TEOS Selectivity |
|---|---|---|---|---|
| 5A | 1200 | 89 | 1680 | 0.6:1 |
| 5B | 1400 | 157 | 350 | 4.0:1 |
| 5C | 1170 | 88 | 3120 | 0.4:1 |
| 5D | 2170 | 148 | 1270 | 1.7:1 |
| 5E | 1390 | 170 | 420 | 3.3:1 |
| 5F | 2240 | 174 | 760 | 2.9:1 |
| 5G | 1840 | 171 | 740 | 2.5:1 |

As is apparent from the results set forth in Tables 5 and 6 the use of a colloidal silica dispersion made up of aggregated colloidal silica particles in which greater than 30 percent of the aggregates included three or more primary particles enables the W and TEOS polish rates to be tuned over a wide range. For example, varying the pH, the iron concentration, and the solids concentration enabled W:TEOS selectivities to be achieved over a range from 0.4:1 to 4:1W. As is also apparent from the results in Tables 5 and 6 polishing composition 5G having a higher conductivity than counterpart polishing composition 5D had a significantly lower TEOS polishing rate. Moreover, polishing compositions 5A and 5C having an electrical conductivity of less than 600 µS/cm were observed to have W:TEOS a selectivity of less than 1:1 and TEOS removal rates of greater than 1500 Å/min. This comparison illustrates that controlling slurry conductivity can be useful in controlling the TEOS removal rate and the W:TEOS selectivity.

EXAMPLE 6

Zeta potential measurements and conductivity measurements were obtained for treated silica samples before and after filtration. A 200 ml volume of each composition was filtered through a Millipore Ultracell regenerated cellulose ultrafiltration disk (having a MW cutoff of 100,000 Daltons and a pore size of 6.3 nm). The remaining dispersion (the dispersion that was retained by the ultrafiltration disk) was collected and replenished to the original 200 ml volume using deionized water adjusted to the starting pH of 3 using nitric acid. This procedure was repeated for a total of three ultrafiltration cycles (each of which included an ultrafiltration step and a replenishing step). After three filtration cycles, the conductivity of the filtered/replenished polishing composition was adjusted back to the original value using potassium chloride. The zeta-potentials and electrical conductivities of the polishing compositions were measured before and after the ultrafiltration procedure (i.e., for the original polishing composition and the triply ultra-filtered and replenished polishing composition). The zeta-potentials were measured using a Model DT 1202 Acoustic and Electro-acoustic spectrometer (available from Dispersion Technologies).

Table 7 shows the measured zeta potentials and conductivities for polishing compositions 6A and 6B. Polishing composition 6A contained a 55 nm colloidal silica in which greater than 30 percent of the aggregates included three or more primary particles while polishing composition 7B contained a 55 nm colloidal silica treated with tetrabutylammonium hydroxide. As described above, the zeta potential and electrical conductivity of the original compositions were measured before and after above described ultrafiltration procedure.

TABLE 7

| Polishing Composition | Conductivity Before (µS/cm) | Conductivity After (µS/cm) | Adjusted Conductivity (µS/cm) | Zeta Potential Before (mV) | Zeta Potential After (mV) |
|---|---|---|---|---|---|
| 6A | 459 | 418 | 458 | 10 | 9 |
| 6B | 1083 | 1030 | NA | 10 | 3 |

As is apparent from the results set forth in Table 5, the zeta potential of sample 6A is essentially un-changed by filtration indicating that the colloidal silica has a permanent positive charge of about 9 mV. The zeta potential of sample 6B decreased from 10 to 3 mV indicating that the positive charge on the colloidal silica was not permanent.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A chemical mechanic polishing composition comprising:
   a water based liquid carrier;
   colloidal silica abrasive particles dispersed in the liquid carrier, wherein 30 percent or more of the colloidal silica abrasive particles include three or more aggregated primary particles, the colloidal silica abrasive particles having a permanent positive charge of at least 6 mV;
   an iron containing accelerator; and
   an oxidizer.

2. The composition of claim 1, wherein the iron containing accelerator comprises a soluble iron containing catalyst.

3. The composition of claim 2 further comprising a stabilizer bound to the soluble iron containing catalyst, the stabilizer being selected from the group consisting of phosphoric acid, acetic acid, phthalic acid, citric acid, adipic acid, oxalic acid, malonic acid, aspartic acid, succinic acid, glutaric acid, pimelic acid, suberic acid, azelaic acid, sebacic acid, maleic acid, glutaconic acid, muconic acid, ethylenediaminetetraacetic acid, propylenediaminetetraacetic acid, and mixtures thereof.

4. The composition of claim 1, wherein the oxidizer comprises hydrogen peroxide.

5. The composition of claim 1, having a pH in a range from about 3 to about 4.

6. The composition of claim 1, having an electrical conductivity of less than 1000 µS/cm.

7. The composition of claim 1, having an electrical conductivity of less than 600 µS/cm.

8. The composition of claim 1, wherein the colloidal silica abrasive particles have a mean particle size in a range from about 40 nm to about 70 nm.

9. The composition of claim 1, wherein the colloidal silica abrasive particles have a mean particle size in a range from about 45 nm to about 65 nm.

10. The composition of claim 1, comprising from about 1 weight percent to about 4 weight percent of the colloidal silica abrasive particles.

11. The composition of claim 1, further comprising an amine compound in solution in the liquid carrier.

12. The composition of claim 1, wherein:
the composition has a pH in a range from about 3 to about 4,
the composition has an electrical conductivity of less than 1000 µS/cm,
the composition has from about 1 weight percent to about 4 weight percent of the colloidal silica abrasive particles; and
the colloidal silica abrasive particles have a mean particle size in a range from about 40 nm to about 70 nm.

13. A chemical mechanic polishing composition comprising:
a water based liquid carrier;
colloidal silica abrasive particles dispersed in the liquid carrier, the colloidal silica abrasive particles having a permanent positive charge of at least 6 mV, wherein 30 percent or more of the colloidal silica abrasive particles include three or more aggregated primary particles; and
an oxidizer;
wherein the polishing composition includes from about 1 weight percent to about 4 weight percent of the colloidal silica abrasive particles.

14. The composition of claim 13, wherein the oxidizer comprises hydrogen peroxide.

15. The composition of claim 13, having a pH in a range from about 3 to about 4.

16. The composition of claim 13, having an electrical conductivity of less than 1000 µS/cm.

17. The composition of claim 13, having an electrical conductivity of less than 600 µS/cm.

18. The composition of claim 13, wherein the colloidal silica abrasive particles have a mean particle size in a range from about 40 nm to about 70 nm.

19. The composition of claim 13, wherein the colloidal silica abrasive particles have a mean particle size in a range from about 45 nm to about 65 nm.

20. The composition of claim 13, further comprising an amine compound in solution in the liquid carrier.

21. A method of chemical mechanical polishing a substrate including tungsten and silicon dioxide layers, the method comprising:
(a) contacting the substrate with a polishing composition comprising:
(i) a water based liquid carrier;
(ii) colloidal silica abrasive particles dispersed in the liquid carrier, wherein 30 percent or more of the colloidal silica abrasive particles include three or more aggregated primary particles, the colloidal silica abrasive particles having a permanent positive charge of at least 6 mV;
(iii) an iron containing accelerator; and
(iv) an oxidizer;
(b) moving the polishing composition relative to the substrate; and
(c) abrading the substrate to remove a portion of the tungsten from the substrate and thereby polish the substrate.

22. The method of claim 21, wherein a rate of removal of silicon dioxide in (c) is greater than or equal to a rate of removal of tungsten in (c).

23. The method of claim 21, wherein the polishing composition has a pH in a range from about 3 to about 4.

24. The method of claim 21, wherein the polishing composition has an electrical conductivity of less than 1000 µS/cm.

25. The method of claim 21, wherein the colloidal silica abrasive particles in the polishing composition have a mean particle size in a range from about 45 nm to about 65 nm.

* * * * *